(12) United States Patent
Dage (10) Patent No.: US 8,096,482 B2
(45) Date of Patent: Jan. 17, 2012

(54) SYSTEM AND METHOD FOR CONTROLLING A CLIMATE CONTROL SYSTEM WITH REMOTE START OPERATION

(75) Inventor: Gerhard A. Dage, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 542 days.

(21) Appl. No.: 12/234,842

(22) Filed: Sep. 22, 2008

(65) Prior Publication Data

US 2010/0072290 A1    Mar. 25, 2010

(51) Int. Cl.
*G05D 23/00* (2006.01)
*B60H 1/00* (2006.01)

(52) U.S. Cl. ......... 236/51; 62/244; 165/202; 123/179.2; 123/179.3

(58) Field of Classification Search .................. 236/51; 62/180, 186, 243, 244; 165/202; 123/179.2, 123/179.3
See application file for complete search history.

(56) References Cited

U.S. PATENT DOCUMENTS

| | | | | |
|---|---|---|---|---|
| 4,488,411 A | * | 12/1984 | Hara | 62/133 |
| 5,511,724 A | * | 4/1996 | Freiberger et al. | 236/49.3 |
| 5,582,234 A | * | 12/1996 | Samukawa et al. | 165/204 |
| 5,632,156 A | * | 5/1997 | Takeo et al. | 62/228.4 |
| 6,304,803 B1 | * | 10/2001 | Dao | 701/36 |
| 6,885,285 B2 | | 4/2005 | Losey | |
| 6,892,807 B2 | * | 5/2005 | Fristedt et al. | 165/202 |
| 7,441,414 B2 | * | 10/2008 | Ziehr et al. | 62/244 |
| 7,650,864 B2 | * | 1/2010 | Hassan et al. | 123/179.2 |
| 2004/0093155 A1 | | 5/2004 | Simonds et al. | |
| 2006/0049922 A1 | | 3/2006 | Kolpasky et al. | |
| 2006/0130877 A1 | | 6/2006 | Huntzicker | |
| 2007/0144723 A1 | | 6/2007 | Aubertin et al. | |

FOREIGN PATENT DOCUMENTS

JP        2002137630 A   *  5/2002

* cited by examiner

*Primary Examiner* — Marc Norman
(74) *Attorney, Agent, or Firm* — Raymond L. Coppiellie; Brooks Kushman P.C.

(57) ABSTRACT

In at least one embodiment, a system for controlling a vehicle climate control system in response to starting an engine with a remote start operation is provided. The system includes a first sensor for generating a cabin temperature signal indicative of a temperature within the vehicle. The system further includes a controller for controlling idle speed of the engine in response to the cabin temperature signal such that the controlled idle speed enables the climate control system to achieve a desired temperature.

17 Claims, 3 Drawing Sheets

SYSTEM AND METHOD FOR CONTROLLING A CLIMATE CONTROL SYSTEM WITH REMOTE START OPERATION

BACKGROUND

1. Technical Field

One or more of the embodiments of the present invention generally relate to a system and method for controlling a vehicle climate control system in response to executing a remote start operation.

2. Background Art

Current vehicles offer a remote start feature whereby a vehicle occupant may start an engine of the vehicle in response to toggling a key fob or other radio frequency (RF) based transmitter while positioned away from the vehicle. In response to the engine starting, a climate control system in the vehicle generally defaults to the last known state (i.e., state of the climate control system after previous engine shut off). In some cases, defaulting the climate control system to the last known state may not meet the vehicle occupant's climate control needs/desire. For example, in the event the climate control system is turned off or to a cooling mode in the last known state and the vehicle occupant wants the vehicle to pre-heat after remotely starting the vehicle, the climate control system is not capable of complying with the occupant's needs.

In the event the climate control system is set to a climate mode that is desired by the occupant, such a condition may cause the climate control system to operate at maximum levels (e.g., increased blower speed) until the previously set temperature as defined from the from the last known state is achieved. Such a condition may increase fuel consumption. Further, climate control settings defined from the last known state may not be optimal for achieving the desired temperature. For example, a climate control system may blow in air from the exterior of the vehicle and pre-heat the air in the event the climate control system is configured to receive such exterior air based on the previous setting. However, in some cases it may be advantageous to use air from within the cabin of the vehicle to achieve the desired temperature for pre-heat conditions. Such a condition may inherently cause the climate control system to take longer to achieve the desired hotter temperature and lead to increased fuel consumption.

SUMMARY

In at least one embodiment, a system for controlling a vehicle climate control system in response to starting an engine with a remote start operation is provided. The system includes a first sensor for generating a cabin temperature signal indicative of a temperature within the vehicle. The system further includes a controller for controlling idle speed of the engine in response to the cabin temperature signal such that the controlled idle speed enables the climate control system to achieve a desired temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
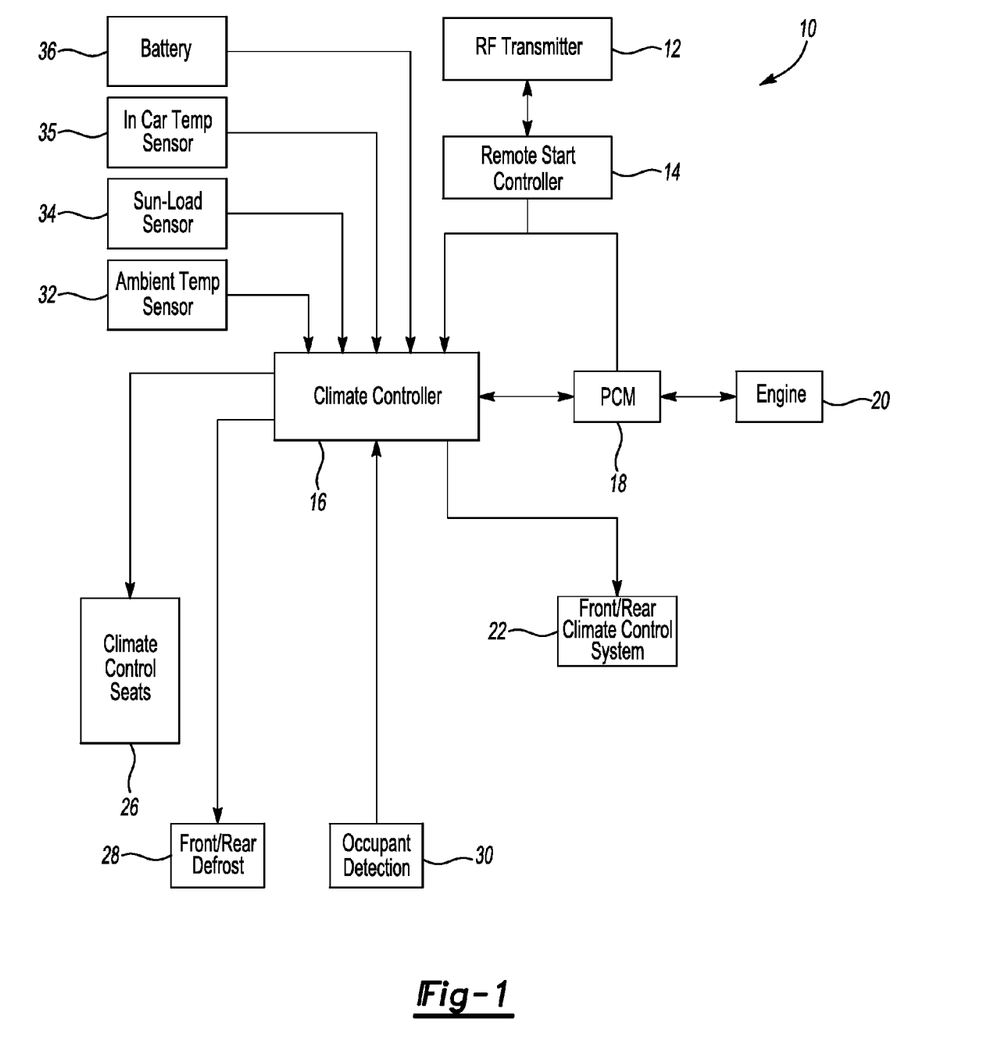
FIG. 1 depicts a system for controlling climate control in a vehicle in response to executing a remote start operation in accordance to one embodiment of the present invention.
Figure 2:
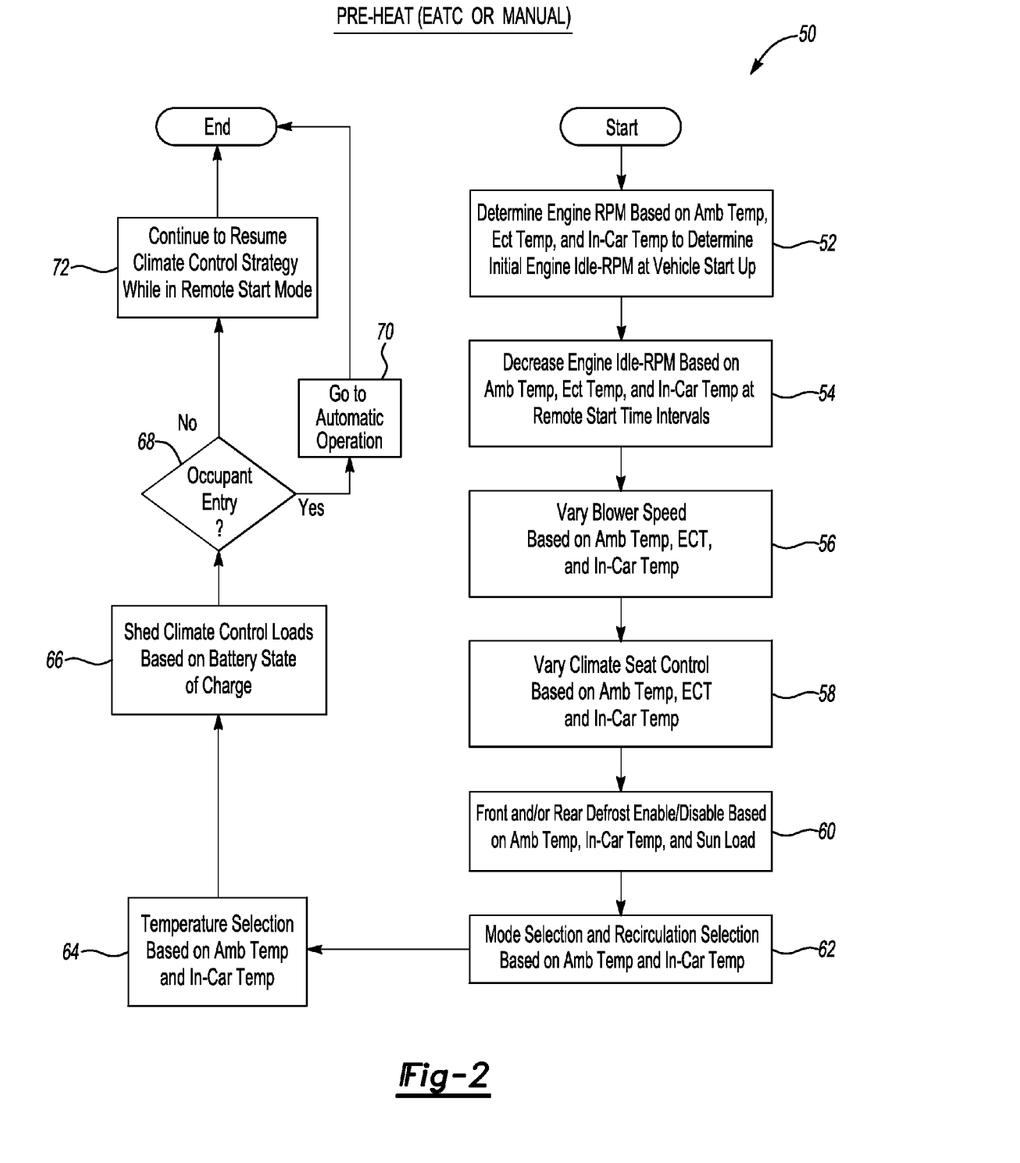
FIG. 2 depicts a diagram for controlling a pre-heat operation in response to executing a remote start operation in accordance to one embodiment of the present invention.
Figure 3:
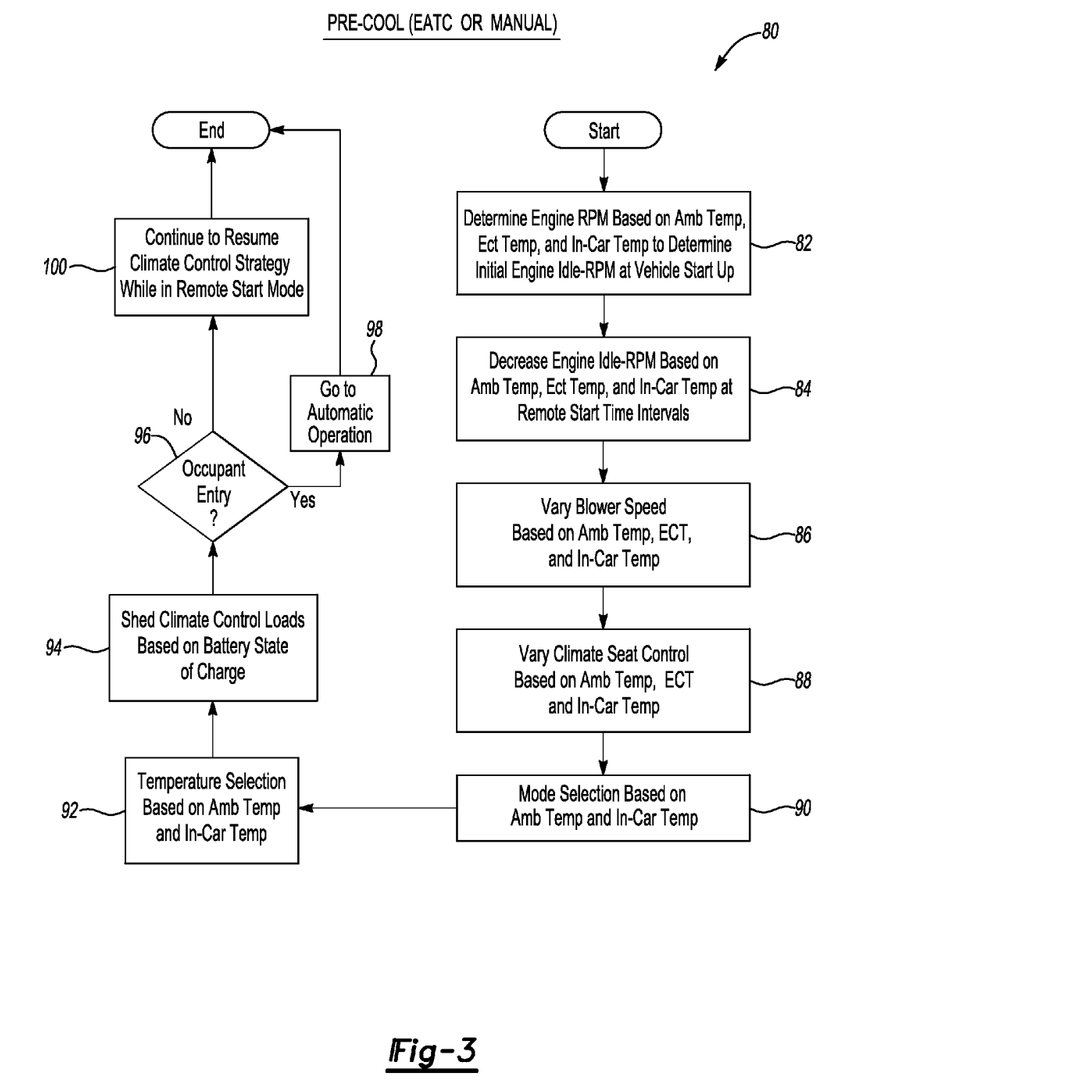
FIG. 3 depicts a diagram for controlling a pre-cool operation in response to executing a remote start operation in accordance to one embodiment of the present invention.

The embodiments of the present invention as set forth in FIGS. 1-3 generally illustrate and/or describe a plurality of controllers (or modules), or other such electrically based components for use in a climate control system of a vehicle. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers and/or modules may be combined with each other and/or separated in any manner based on the particular type of electrical architecture that is desired or intended to be implemented in the vehicle.

One or more embodiments of the present invention generally include and not limited to a climate controller having a control strategy therein for controlling the climate control system of a vehicle when a remote start operation is used to start the vehicle. The climate controller is generally coupled to a plurality of sensors and/or controllers located throughout the vehicle to automatically adjust the level of heating and cooling in the vehicle based on status signals transmitted from the sensors and/or controllers.

The climate controller is generally configured to provide a custom operation for providing optimal comfort upon occupant entry into the vehicle while achieving higher levels of fuel economy after executing a remote start operation. The climate controller may perform, and not limited to, engine idle control (e.g., increase/decrease) as needed for comfort/fuel economy, heated and cooled seat operation control as needed, front and rear defrost control, climate system control such as blower speed, mode, recirculation, temperature settings regardless of last known programmed setting, and load shedding control based on battery state of charge. Such control over the climate control system may optimize fuel economy and provide optimal comfort for the occupant prior to occupant entry into the vehicle in the event the remote start operation is invoked.

Referring now to FIG. 1, a system 10 for controlling vehicle climate control with a remote start operation in accordance to one embodiment of the present invention is shown. The system 10 generally comprises an RF transmitter 12, a remote start controller 14, a climate controller 16, a powertrain control module (PCM) 18 and an engine 20. The remote start controller 14, the climate controller 16, and the PCM 18 may be operatively coupled to each via a data bus. The data bus may be a Controller Area Network (CAN) bus, local interconnect network (LIN) or other suitable data bus generally to facilitate data communication within the vehicle.

The RF transmitter 12 may be implemented as a key fob and be used to send encrypted RF data to the remote start controller 14 while the vehicle occupant is located exterior to the vehicle. In response to the RF encrypted data, the remote start controller 14 may transmit a start engine command over the data bus to the PCM 18 so that the PCM 18 starts the engine 20 of the vehicle via the PCM 18. The RF transmitter 12 may also be implemented as a cell phone or other suitable device generally situated to activate the remote start operation. Additional devices can be used to initiate the remote start operation such as laptops or on-board timers.

The remote start controller 14 may transmit an engine start message over the data bus to the climate controller 16. A climate control system 22 is operatively coupled to the climate controller 16. The climate controller 16 is generally configured to the control the operation of the climate control system 22 (e.g., heating/cooling of the interior of the vehicle).

The climate controller 16 and the climate control system 22 generally define a heating, ventilation, and air conditioning (HVAC) system of the vehicle. The climate control system 22 generally comprises, an evaporator, condenser, compressor and other items known in the art to heat and cool the vehicle cabin. The climate controller 16 may be implemented as a climate control head positioned on an instrument panel of the vehicle. The climate controller 16 may include a plurality of input switches for user selection to select climate control options. Such options may include, and not limited to, setting desired temperatures for a given zone(s) in the vehicle, selecting between panel, floor, and front window defrost modes, rear window defrost 28, selecting blend modes between heated and cooled air, recirculation of cabin air, and selecting blower speeds for distributing air throughout the cabin of the vehicle.

The climate controller 16 and the climate control system 22 may be adapted for use in a manual temperature control system or in an electronic temperature control (ETC) system. A rear climate control system (not shown) may be optionally coupled to the climate controller 16. In general, the rear climate control system generally provides conditioned heated or cooled air for passengers seated in the rear of the vehicle. The rear climate control system may be implemented for minivans, sport utility vehicle or other such vehicles generally recognized to utilize such a system for occupants seated proximate to the rear of the vehicle.

Climate control seats 26 may optionally be coupled to the climate controller 16. Such seats 26 may be heated and/or cooled seats. In one example, the climate control seats 26 may include a heated seat module or climate control seat module that is responsive to the climate controller 16. One or more switches may be coupled to the climate controller 16 to allow occupants to control the operation of the heated and/or cooled seats. In such a case, the climate controller 16 may transmit control signals over the data bus to the climate control seat module and/or the heated seat module to control the heated seat and cooled seat operation. In another example, the switches may be directly coupled to the heated and/or climate control seat module to allow occupants to heat or cool seats accordingly. The climate controller 16 may also be coupled to a heated steering wheel (not shown) for controlling heated steering operation.

The climate controller 16 is operably coupled to a front/rear defrost system 28 for removing ice from front and rear windows of the vehicle. An occupant detection system 30 is coupled to the climate controller 16 to notify the climate controller 16 when a vehicle occupant has entered into the vehicle or to notify the climate controller 16 as to the number of occupants in the vehicle. In one example, the occupant detection system 30 may comprise one or more door ajar switches that are operably coupled to a door module such that the door module sends a door ajar message on the data bus to the climate controller 16 to notify the climate controller 16 that a vehicle occupant has entered into the vehicle. In another example, the occupant detection system 30 may include a plurality of seat sensors positioned about seats of the vehicle to detect the presence of an occupant in the vehicle and transmit such data to the climate controller 16 over the data bus.

The climate controller 16 may be coupled to a battery 36 to measure voltage of the battery 36 for load shedding purposes. An ambient temperature sensor 32 may be coupled to the climate controller 16 for providing temperature of the atmosphere exterior to the vehicle (or the ambient temperature). A sun-load sensor 34 may be coupled to the climate controller 16 for detecting the amount of visible light with respect to the vehicle. An in-car temperature sensor 35 may be coupled to climate controller 16 for providing cabin temperature (or in-car temperature) of the vehicle. The engine 20 is generally configured to transmit engine coolant temperature (ECT) to the climate controller 16. The engine 20 is also generally configured to control engine idle speed.

The signals related to ECT, cabin temperature, the ambient temperature, battery voltage, occupant detection, as well as the remaining items of the system 10 will be discussed in more detail below.

Referring now to FIG. 2, a diagram 50 for controlling a pre-heat operation in response to executing a remote start operation is shown in accordance to one embodiment of the present invention.

In block 52, the climate controller 16 transmits the ambient temperature and the cabin temperature to the PCM 18 in response to the occupant executing the remote start operation. The PCM 18 determines the engine idle speed (e.g., RPM) based on the ECT, the ambient temperature, and the cabin temperature at vehicle startup. The engine idle speeds at which the engine 20 operates based on the ECT, the ambient temperature, and the cabin temperature is shown for exemplary purposes below in Table 1. Table 1 also illustrates the remote start time interval for the corresponding ECT, ambient temperature, and cabin temperature. Table 1 is shown as an example and it is generally understood that the values corresponding to the ECT, the ambient temperature, the cabin temperature and the engine idle speeds may vary based on the type of vehicle used and the vehicle content within such a vehicle. The values for the ECT, the ambient temperature, the cabin temperature, and the engine idle speed may vary based on the desired criteria of a particular implementation.

TABLE 1

| Idle Bump Reduction Schedule (based on | | </=0 F. amb | | | 10 F. amb | | | 20 F. amb | | | 30 F. amb | | | 40 F. amb | | |
|---|---|---|---|---|---|---|---|---|---|---|---|---|---|---|---|---|
| RS time (mins) | time or cabin temp? | ECT F (est) | Cabin Temp F. (est) | idle speed (est) | ECT F (est) | Cabin Temp F. (est) | idle speed (est) | ECT F (est) | Cabin Temp F. (est) | idle speed (est) | ECT (est) | Cabin Temp (est) | idle speed (est) | ECT F (est) | Cabin Temp F. (est) | idle speed (est) |
| 0 (start) | Initial idle bump | 0 | 0 | 1400 | 10 | 10 | 1200 | 20 | 20 | 1200 | 30 F. | 30 F. | 1000 | 40 | 40 | 800 |
| 2 | 1st idle reduction | 10 | 5 | 1200 | 20 | 15 | 1200 | 30 | 25 | 1000 | 40 F. | 30 F. | 1000 | 50 | 50 | 800 |
| 5 | 2nd idle reduction | 50 | 20 | 1000 | 60 | 20 | 1000 | 70 | 30 | 1000 | 90 F. | 40 F. | 800 | 100 | 60 | 800 |
| 8 | 3rd idle reduction | 70 | 25 | 1000 | 80 | 30 | 800 | 90 | 40 | 800 | 110 F. | 50 F. | 800 | 120 | 65 | 800 |
| 10 | base | 80 | 30 | 1000 | 90 | 40 | 800 | 110 | 50 | 800 | 120 F. | 55 F. | 800 | 130 | 70 | 800 |

In reference to Table 1, at 0 RS time, and in the event the ECT, the ambient temperature, and the cabin temperature each correspond to zero degrees, such a condition may cause the PCM 18 to control the engine 20 to operate at 1400 rpm while idling. As exhibited in Table 1, as the ECT, the ambient temperature, and the cabin temperature increase, the PCM 18 reduces the idle speed accordingly to optimize fuel economy. It is to be appreciated that the PCM 18 may increase the idle speed of the engine 20 in order to heat the ECT at a faster rate. For example, by increasing the temperature of the ECT, such a condition may allow the climate control system 16 to produce heat at a greater rate. In general, the higher the engine RPM the faster the engine 20 warms up. As the temperature of the engine 20 increases, the ECT increases, thereby producing heat at a greater rate. In the event the cabin temperature is increased, such a condition may not make it necessary to drive the engine 20 at a higher idle speed.

In block 54, the climate controller 16 continues to transmit the ambient temperature and the cabin temperature to the PCM 18. The PCM 18 adjusts the engine idle speed accordingly based on the ECT, the ambient temperature and the cabin temperature as the RS time interval counts down. As shown in Table 1, as the RS time interval elapses and the corresponding temperatures of the ECT, the ambient, and the cabin temperature increase, the PCM 18 reduces engine idle speed accordingly. There may even be an occasion when the engine shuts off altogether in the event it is not needed to provide heat.

In block 56, the climate controller 16 monitors the ECT, the ambient temperature, and the cabin temperature to determine the corresponding speed for driving the blowers within the climate control system 22. The speeds at which the blower operates based on the ECT, the ambient temperature and the cabin temperature is shown in Tables 2A-2B. Tables 2A-2B depict example values corresponding to the ECT, the cabin temperature, the ambient temperature, and the blower speed. The ECT, the ambient temperatures, the cabin temperature and the blower speed may vary based on the type of vehicle used and content within such a vehicle. The values for ECT, the ambient temperatures, the cabin temperature and the blower speed may vary based on the desired criteria of a particular implementation.

TABLE 2A

| Amb temp (F.) | ECT (F.) | Blower speed (volts) |
|---|---|---|
| 0 | 0 | 4 |
| 0 | 20 | 5 |
| 0 | 40 | 6 |
| 0 | 60 | 9 |
| 0 | 80 | max |
| 0 | 100 | max |
| 0 | 120 | max* |
| 0 | 140 | max* |
| 0 | 160 | max* |

TABLE 2B

| Amb temp (F.) | ECT (F.) | Blower speed (volts) |
|---|---|---|
| 30 | 0 | 4 |
| 30 | 20 | 7 |
| 30 | 40 | 9 |
| 30 | 60 | 11 |
| 30 | 80 | max |
| 30 | 100 | max |
| 30 | 120 | max* |
| 30 | 140 | max* |
| 30 | 160 | max* |

As shown in Tables 2A-2B, as the ECT increases, the climate controller 16 controls the speed of the blower to increase as well. In general, it may not be desirable to control the blower to operate at higher speed as in the case of pre-heat when the engine of the vehicle is first started and the ECT is relatively cold, such a condition may cause the blower to operate at a higher speed thereby blowing colder air throughout the cabin. Such a condition may not be optimal for pre-heating. It may be more efficient for comfort purposes to operate the blower at higher speeds as the temperature of the ECT increases. Since the cabin may be unoccupied during remote start, the HVAC system may operate in unconventional air delivery modes and higher blower speeds. Such a condition may allow the entire cabin to come to comfort quicker thereby allowing for a reduced remote start time. This type of operation is not performed when occupied because it may lead to complaints of high noise, vibration, and harshness (NVH) levels, air draft, etc. The system 10 may then return to normal system mode and blower operation when vehicle entry is sensed. As illustrated in Tables 2A-2B, "max*" may correspond to the condition whereby the blower is capable of reaching a maximum speed if needed to obtain comfort for the vehicle occupant.

In block 58, the climate controller 16 (or heated or cooling seat module) controls the amount of power used by the heated seat based on the ambient temperature and the cabin temperature. Tables 3A-3B depict example values corresponding to the cabin temperature, the ambient temperatures, and heated seat power level. The ambient temperature, the cabin temperature, and the heated seat power level may vary based on the type of vehicle used and content within such a vehicle. The values for the ambient temperatures, the cabin temperatures and the heated seat power level may vary based on the desired criteria of a particular implementation.

TABLE 3A

| Amb temp (F.) | in car temp (F.) | Heat seat power |
|---|---|---|
| 0 | 0 | max |
| 0 | 0 | max |
| 0 | 0 | max |
| 0 | 0 | max |
| 0 | 0 | max |
| 0 | 0 | max |
| 0 | 0 | 4 |
| 0 | 5 | 3 |
| 0 | 10 | 2 |

TABLE 3B

| Amb temp (F.) | in car temp (F.) | Heat seat power |
|---|---|---|
| 30 | 30 | max |
| 30 | 32 | max |
| 30 | 36 | max |
| 30 | 39 | 4 |
| 30 | 42 | 3 |
| 30 | 46 | 2 |
| 30 | 50 | 1 |
| 30 | 55 | 1 |
| 30 | 60 | off |

As shown in Tables 3A-3B, in the event the ambient temperature exhibits colder temperatures (e.g., 0 degrees), the heated seat power level is set to operate at maximum power for a longer duration. In the event the ambient temperature exhibits warmer temperatures (e.g., 30 degrees), the heated seat power level is set to operate at a maximum power level for a shorter duration and the heated seat power level ramps down as the cabin temperature increases. By gradually reducing the heated seat power levels, such a condition may optimize fuel economy while in the remote start mode. It is generally contemplated that the climate controller 16 may also control or enable the heated steering wheel operation in response to executing the remote start operation. In such a case, the climate controller 16 may initially drive the heated steering wheel at a maximum power and ramp down the power in a linear manner as the time interval elapses.

In block 60, the climate controller 16 controls the operation of the front and/or rear defrost 28 based on the ambient temperature and the cabin temperature. Such a strategy is generally based on the notion that defrosting of the windows may be needed when the temperatures (e.g., ambient and cabin temperatures) indicate that frost conditions may be present. Table 4 depicts example values corresponding to the ambient temperature, the cabin temperature, and the time interval the defrost 28 is turned on. The values for the ambient temperature, the cabin temperature and the time interval the defrost 28 is turned on may vary based on the desired criteria of a particular implementation.

TABLE 4

| Amb Temp (F.) | In car temp (at start) | Front and/or Rear def on time |
|---|---|---|
| 0 | 0 | 10 |
| 10 | 10 | 7 |
| 20 | 20 | 5 |
| 30 | 30 | 3 |
| 40 | 40 | off |

As shown in Table 4, as the ambient and the cabin temperatures increase, the time interval that the defrost 28 is left on decreases. Such a condition may optimize fuel economy. The climate controller 16 may also adjust the defrost 28 on time in the event the sun load sensor 34 transmits data indicating the presence of a sunny day. In such a case, the defrost 28 on time may be reduced accordingly to optimize fuel economy.

In block 62, the climate controller 16 controls the mode and recirculation schedule of the climate control system 22 based on the ambient temperature and the cabin temperature. Tables 5A-5B depict example values corresponding to the cabin temperature, the ambient temperature, and mode and recirculation schedules. The cabin temperature, the ambient temperature, and mode and recirculation schedules may differ based on the type of vehicle used and the content within such a vehicle. The values for the ambient temperature, the cabin temperature, and the mode and recirculation schedules may vary based on the desired criteria of a particular implementation.

TABLE 5A

| Amb Temp (F.) | in car temp (F.) | mode | recirc pos |
|---|---|---|---|
| 0 | 0 | panel | rec |
| 0 | 10 | panel | rec |
| 0 | 20 | panel | rec |
| 0 | 30 | panel | ½ fresh |
| 0 | 40 | flr/def | ½ fresh |
| 0 | 50 | floor | fresh |
| 0 | 60 | floor | fresh |
| 0 | 70 | floor | fresh |

TABLE 5B

| Amb Temp (F.) | in car temp (F.) | mode | recirc pos |
|---|---|---|---|
| 30 | 30 | panel | rec |
| 30 | 35 | panel | rec |
| 30 | 40 | panel | ½ fresh |
| 30 | 45 | panel | ½ fresh |
| 30 | 50 | flr/def | fresh |
| 30 | 55 | floor | fresh |

TABLE 5B-continued

| Amb Temp (F.) | in car temp (F.) | mode | recirc pos |
|---|---|---|---|
| 30 | 60 | floor | fresh |
| 30 | 65 | floor | fresh |
| 30 | 70 | floor | fresh |

As shown in Tables 5A-5B, at lower ambient and cabin temperatures, the panel mode is enabled to pass air through the cabin of the vehicle. The panel mode may facilitate for a greater quantity of air flow (e.g., heated air) through the cabin. The recirculation mode may also be enabled in response to the climate controller 16 as the recirculation mode passes air from within the cabin of the vehicle into the blower. The temperature of the air from within the cabin may be warmer than the temperature of the air from the exterior of the vehicle. As such, it may be more effective to achieve the desired heat (or temperature) if the recirculation mode is enabled first. As the cabin temperature increases, the mode selection moves to the floor/defrost and then to floor. Normal operation of the mode selection generally includes moving to the floor/defrost function. As the cabin temperature reaches a predetermined cabin temperature, the climate controller 16 switches from floor/defrost mode to floor mode. The floor mode may be optimal after the vehicle cabin reaches the predetermined cabin temperature as vehicle occupants may prefer to have heat directed towards their legs and feet in colder climates.

In block 64, the climate controller 16 controls the temperature setting/selection based on the ambient temperature and the cabin temperature. Tables 6A-6B depict example values corresponding to the cabin temperature, the ambient temperature, and temperature setting. The cabin temperature, the ambient temperature, and temperature setting may differ based on the type of vehicle used and the content within such a vehicle. The values for the cabin temperature, the ambient temperature, and the corresponding temperature setting may vary based on the desired criteria of a particular implementation.

TABLE 6A

| Amb Temp (F.) | in car temp (F.) | temp door |
|---|---|---|
| 0 | 0 | max ht |
| 0 | 10 | max ht |
| 0 | 20 | max ht |
| 0 | 30 | max ht |
| 0 | 40 | max ht |
| 0 | 50 | max ht |
| 0 | 60 | max ht |
| 0 | 70 | blend |

TABLE 6B

| Amb Temp (F.) | in car temp (F.) | temp door |
|---|---|---|
| 30 | 30 | max ht |
| 30 | 35 | max ht |
| 30 | 40 | max ht |
| 30 | 45 | max ht |
| 30 | 50 | max ht |
| 30 | 55 | max ht |
| 30 | 60 | blend |
| 30 | 65 | blend |
| 30 | 70 | blend |

As shown in Tables 6A-6B, at lower ambient and cabin temperatures, the climate controller 16 controls the climate control system 22 to discharge air at the maximum heat level. After the cabin temperature reaches predetermined levels, the climate controller 16 controls the climate control system 22 to blend between heated and cooled air. In general, the blend mode between heated and cooled air prevents the cabin from excessive overshoot, potentially leading to discomfort.

In block 66, the climate controller 16 determines the state of charge of the battery 36. In one example, the battery 36 may be coupled to a battery control module (BCM) (not shown) which is configured to provide the current state of charge of the battery 36. The BCM transmits such data over the bus to the climate controller 16. In another example, a current sensor (not shown) may be coupled to the battery 36 and transmit current readings directly to the climate controller 16 such that the climate controller 16 determines the state of charge of the battery 36. In the event the state of charge is below a predetermined state of charge, the climate controller 16 may shed loads to minimize current consumption to preserve the integrity of the battery 36. For example, the climate controller 16 may disable the front and/or rear defrost 28 in the event the front and/or rear defrost 28 was enabled. In addition, the climate controller 16 may reduce blower speed by a predetermined amount. In one example, the climate controller 16 may reduce blower speed by 50% to reduce current consumption. Further, the climate controller 16 may disable the heated seat operation in the event the heated seat operation is enabled. Such actions by the climate controller 16 may assist in reducing overall current consumption and assist in maintaining the battery state of charge at an optimal level. In another example, the climate controller 16 measures a voltage level of the battery 36. In the event the measured battery voltage level is below a predetermined battery voltage level, the climate controller 16 may shed loads to minimize battery current consumption.

It is generally contemplated that blocks 52, 54, 56, 58, 60, 62, 64, and 66 may be executed in any sequence or order. Further, one or more of the blocks 52, 54, 56, 58, 60, 62, 64, and 66 may be executed simultaneously with one another. Further, it is generally contemplated that the diagram 50 may execute any one or more of the blocks 52, 54, 56, 58, 60, 62, 64, and 66 in connection with the rear climate control system 22.

In block 68, the climate controller 16 determines whether the occupant has entered the vehicle within the RS time interval. In such a case, the occupant detection system 30 transmits occupant detection messages on the data bus to the climate controller 16 in the event an occupant is detected to be in the vehicle. If an occupant is detected to be entering into or in the vehicle, the diagram 50 moves to block 70. If an occupant is not detected to be entering into or in the vehicle, the diagram 50 moves to block 72.

In block 70, the climate controller 16 controls the climate control system 22 to operate at pre-set levels (e.g., all pre-sets as programmed or defined by the vehicle occupant in moments of normal climate control operation) on all climate control functions. The occupant may override any such pre-set climate operations and manually set any such climate control function as desired as is typically the case when the occupant is in the vehicle.

In block 72, the climate controller 16 resumes the climate control strategy (e.g., blocks 52, 54, 56, 58, 60, 62, 64, 66, and 68) while within the RS time interval. The vehicle may automatically shut the engine down and climate control function down in the event the RS time interval expires.

Referring now to FIG. 3, a diagram 80 for controlling a pre-cool operation in response to executing the remote start operation is shown in accordance to one embodiment of the present invention.

In block 82, the climate controller 16 transmits the ambient temperature and the cabin temperature to the PCM 18 in response to the occupant executing the remote start operation. The PCM 18 determines the engine idle speed (e.g., RPM) based on the ambient temperature and the cabin temperature at vehicle startup. The engine idle speeds at which the engine 20 operates based on the ambient temperature and the cabin temperature is shown for exemplary purposes below in Table 7. Table 7 also illustrates the remote start time interval for the corresponding ambient temperature and cabin temperature. Table 7 is shown as an example and it is generally understood that the values corresponding to the ambient temperature, the cabin temperature, and the engine idle speed may vary based on the type of vehicle used and the vehicle content. The values for the ambient temperature, the cabin temperature, and the engine idle speed may vary based on the desired criteria of a particular implementation.

circulating warm air within the cabin of the vehicle. As the climate controller 16 detects a drop in the cabin temperature, the climate controller 16 may increase blower speed to increase the flow of the cooler air throughout the cabin of the vehicle. In yet another example, the climate controller 16 drives the blower at the highest speed as it may not take long for the climate control system 22 to generate cooled air.

In block 88, the climate controller 16 (or cooling seat module) controls the amount of power used by the seats to circulate cold air therein based on the ambient temperature and the cabin temperature. Tables 8A-8B depict example values corresponding to the cabin temperature, the ambient temperature and cooled seat power levels.

TABLE 8A

| Amb Temp (F.) | in car temp (F.) | Cooled seat power |
|---|---|---|
| 70 | 110 | max |
| 70 | 105 | max |
| 70 | 100 | max |

TABLE 7

| | Idle Bump Reduction Schedule (based on | >/=100 F. amb | | 90 F. amb | | 80 F. amb | | 70 F. amb | | </=60 F. amb | |
|---|---|---|---|---|---|---|---|---|---|---|---|
| RS time (mins) | time or cabin temp? | Cabin Temp F. (est) | idle speed (est) | Cabin Temp F. (est) | idle speed (est) | Cabin Temp F. (est) | idle speed (est) | Cabin Temp (est) | idle speed (est) | Cabin Temp F. (est) | idle speed (est) |
| 0 (start) | Initial idle bump | 150 | 1400 | 130 | 1200 | 120 | 1200 | 110 | 1000 | 95 | 800 |
| 2 | 1st idle reduction | 135 | 1300 | 120 | 1200 | 110 | 1000 | 100 | 1000 | 85 | 800 |
| 5 | 2nd idle reduction | 125 | 1200 | 110 | 1000 | 100 | 1000 | 90 | 800 | 80 | 800 |
| 8 | 3rd idle reduction | 110 | 1100 | 100 | 900 | 95 | 800 | 85 | 800 | 75 | 800 |
| 10 (end) | base | 100 | 1000 | 95 | 800 | 90 | 800 | 80 | 800 | 70 | 800 |

In reference to Table 7, at 0 RS time, and in the event the ambient temperature exceeds 100 degrees and the cabin temperature is greater than 150 degrees, such a condition may cause the PCM 18 to control the engine 20 to operate at 1400 rpm while idling. As exhibited in Table 7, as the ambient and the cabin temperatures decrease, the PCM 18 reduces the idle speed accordingly to optimize fuel economy. By providing for a high engine idle as soon as the vehicle is started, the output of a compressor pump increases in the climate control system 22 thereby causing more refrigerant to flow through an evaporator. Such an increased flow of refrigerant through the evaporator causes the evaporator to provide greater cooling thereby increasing the vehicle's ability to provide cool air.

In block 84, the climate controller 16 continues to transmit the ambient temperature and the cabin temperature to the PCM 18. The PCM 18 adjusts the engine idle speed accordingly based on the ambient temperature and the cabin temperature as time elapses while the vehicle is in the remote start mode. As shown in Table 7, as the RS time interval elapses and the corresponding temperatures of the ambient temperature and the cabin temperature decrease, the PCM 18 reduces engine idle speed accordingly to minimize fuel consumption.

In block 86, the climate controller 16 monitors the ambient temperature and the cabin temperature to determine the corresponding speed for driving blowers within the climate control system 22. In one example, the climate controller 16 may drive the blower at lower speeds after engine startup to avoid TABLE 8A-continued

| Amb Temp (F.) | in car temp (F.) | Cooled seat power |
|---|---|---|
| 70 | 95 | 4 |
| 70 | 90 | 3 |
| 70 | 85 | 2 |
| 70 | 80 | 1 |
| 70 | 75 | 1 |
| 70 | 70 | off |

TABLE 8B

| Amb Temp (F.) | in car temp (F.) | Cooled seat power |
|---|---|---|
| 90 | >100 | max |
| 90 | 95 | max |
| 90 | 90 | max |
| 90 | 85 | 4 |
| 90 | 80 | 3 |
| 90 | 75 | 2 |
| 90 | 70 | 1 |

In general, in the event the ambient and the cabin temperature exhibit hot temperatures, the cooled seat power level is set to operate at a maximum. As the climate controller 16 detects a decrease in the cabin temperature, the climate controller 16 may control the cooled seats such that the cooled seats operate at reduced power levels to minimize fuel consumption.

In block 90, the climate controller 16 controls the mode and recirculation schedule of the climate control system 22 based on the ambient temperature and the cabin temperature. At higher ambient and cabin temperatures, the panel mode is controlled to open to pass air through the cabin of the vehicle. The panel mode may facilitate for a greater quantity of air flow (e.g., cooled air) through the cabin. The climate controller 16 may disable the recirculation mode and pass air from outside of the vehicle into the blower for cooling if the cabin temperature is greater than the ambient temperature. In the event the ambient temperature is greater than the cabin temperature, the climate controller 16 may enable the recirculation mode and pass air for within the cabin into the blower for cooling. It is generally contemplated that the climate controller 16 enables the panel mode even after the cabin temperature cools down as vehicle occupants may desire the panel mode over the floor mode in hot or warmer weather.

In block 92, the climate controller 16 controls the temperature setting/selection based on the ambient temperature and the cabin temperature. In hot weather conditions, the climate controller 16 may control the temperature setting to a maximum cool setting in response to the ambient and the cabin temperatures exceeding predetermined temperature levels. As the cabin temperature decreases, the climate controller 16 may change the temperature setting to a blend between hot and cold to minimize fuel economy and to provide optimal climate control comfort level for the occupant(s).

In block 94, the climate controller 16 determines the state of charge of the battery 36. In one example, the battery 36 may be coupled to a battery control module (BCM) (not shown) which is configured to provide the current state of charge of the battery 36. The BCM transmits such data over the bus to the climate controller 16. In another example, a current sensor (not shown) may be coupled to the battery 36 and transmit current readings directly to the climate controller 16 such that the climate controller 16 determines the state of charge of the battery 36. In the event the state of charge is below a predetermined state of charge, the climate controller 16 may shed loads to minimize current consumption to preserve the integrity of the battery 36. For example, the climate controller 16 may disable the front and/or rear defrost 28 in the event the front and/or rear defrost 28 was enabled. In addition, the climate controller 16 may reduce blower speed by a predetermined amount. In one example, the climate controller 16 may reduce blower speed by 50% to reduce current consumption. Further, the climate controller 16 may disable the heated seat operation in the event the heated seat operation is enabled. Such actions by the climate controller 16 may assist in reducing overall current consumption and assist in maintaining the battery state of charge at an optimal level. In another example, the climate controller 16 measures a voltage level of the battery 36. In the event the measured battery voltage level is below a predetermined battery voltage level, the climate controller 16 may shed loads to minimize battery current consumption.

It is generally contemplated that blocks 82, 84, 86, 88, 90, 92, and 94 may be executed in any sequence or order. Further, one or more of the blocks 82, 84, 86, 88, 90, 92, 94, and 96 may be executed simultaneously with one another. Further, it is generally contemplated that the diagram 80 may execute any one or more the blocks 82, 84, 86, 88, 90, 92, 94, and 96 with the rear climate control system 22.

In block 96, the climate controller 16 determines whether the occupant has entered the vehicle within the RS time interval. In such a case, the occupant detection system 30 transmits occupant detection messages on the data bus to the climate controller 16 in the event an occupant is detected to be in the vehicle. If an occupant is detected to be in the vehicle, the diagram 80 moves to block 98. If an occupant is not detected, then the diagram 80 moves to block 100.

In block 100, the climate controller 16 controls the climate control system 22 to operate at pre-set levels (e.g., all pre-sets as programmed or defined by the vehicle occupant in moments of normal climate control operation) on all climate control functions. The occupant may override any such pre-set climate operations and manually set any such climate control function as desired as is typically the case when the occupant is in the vehicle.

In block 102, the climate controller 16 resumes the climate control strategy (e.g., blocks 82, 84, 86, 88, 90, 92, and 94) while within the RS time interval. The vehicle may automatically shut the engine down and climate control functionality down in the event the RS time interval expires.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling a vehicle climate control system in response to starting an engine with a remote start operation, the system comprising:
    a first sensor for generating a cabin temperature signal indicative of a temperature within the vehicle; and
    a controller configured to control an idle speed of the engine in response to the cabin temperature signal such that the controlled idle speed enables the climate control system to achieve a desired temperature and to decrease the idle speed in response to determining that a temperature exterior to a vehicle as indicated on an ambient temperature signal is increasing over a remote start time interval while the climate control system pre-heats the vehicle.

2. The system of claim 1 further comprising a second sensor for generating the ambient temperature signal.

3. The system of claim 2 wherein the controller is further configured to control the idle speed based on the ambient temperature signal and the cabin temperature signal such that the controlled idle speed enables the climate control system to achieve the desired temperature and the vehicle to minimize fuel consumption.

4. The system of claim 2 wherein the controller is further configured to control blower speed for blowers positioned within the climate control system based on at least one of the cabin temperature signal and the ambient temperature signal.

5. The system of claim 2 wherein controller is further configured to control at least one of climate control seat operation and heated steering wheel operation based on at least one of the cabin temperature signal and the ambient temperature signal.

6. The system of claim 2 further comprising a third sensor for generating a sun-load signal indicative of the amount of visible light that is present, wherein the controller is further configured to control a defrost operation based on at least one of the cabin temperature signal, the ambient temperature signal and the sun-load signal.

7. The system of claim 2 wherein the controller is further configured to control at least one of a mode schedule and a recirculation schedule of the climate control system based on at least one of the cabin temperature signal and the ambient temperature signal.

8. The system of claim 2 wherein the controller is further configured to control temperature selection of the climate control system based on at least one of the cabin temperature signal and the ambient temperature signal.

9. The system of claim 1 further comprising a second sensor for generating an engine coolant temperature (ECT) signal indicative of a temperature of engine coolant within the engine.

10. The system of claim 9 wherein the controller is further configured to control the idle speed of the engine based on the ECT signal and the cabin temperature signal such that the controlled idle speed enables the climate control system to achieve the desired temperature.

11. The system of claim 1 wherein the controller is further configured to decrease the idle speed in response to determining that the ambient temperature signal is decreasing over a remote start time interval while the climate control system pre-cools the vehicle.

12. The system of claim 1 wherein the controller is configured to assess a state of charge of a battery and to selectively disable the operation of the climate control system in response to determining that the state of charge signal is below a predetermined state of charge.

13. The system of claim 1 wherein the remote start time interval corresponds to an amount of time the engine runs while in a remote start mode after the remote start operation is triggered.

14. An apparatus for controlling a climate control system responsive to starting an engine with a remote start operation, the apparatus comprising:
 a controller configured to:
  receive a signal indicative of a cabin temperature within a vehicle;
  control an engine idle speed during a remote start time interval such that the engine idle speed decreases in the event the cabin temperature increases during the remote start time interval for a vehicle pre-heat operation; and
  assess a state of charge of at least one battery and to disable at least a portion of the operation of the climate control system in the event the state of charge of the at least one battery is determined to be below a predetermined state of charge during the remote start time interval.

15. The apparatus of claim 14 wherein the controller is further configured to control the engine idle speed during the remote start time interval such that the engine idle speed decreases as the temperature within the vehicle decreases over the remote start time interval during a vehicle pre-cool operation.

16. The apparatus of claim 14 wherein the remote start time interval corresponds to an amount of time the engine runs while in a remote start mode after the remote start operation is triggered.

17. An apparatus for controlling a climate control system responsive to starting an engine with a remote start operation, the apparatus comprising:
 a controller configured to:
  receive a signal indicative of a cabin temperature within a vehicle;
  control an engine idle speed during a remote start time interval such that the engine idle speed decreases in the event the cabin temperature decreases during the remote start time interval for a vehicle pre-cool operation; and
  assess a state of charge of at least one battery and to disable at least a portion of the operation of the climate control system in the event the state of charge of the at least one battery is determined to be below a predetermined state of charge during the remote start time interval.

* * * * *